United States Patent
Morrison et al.

(10) Patent No.: US 8,326,539 B2
(45) Date of Patent: Dec. 4, 2012

(54) CHARACTERIZING AT LEAST ONE PROPERTY OF A LINER THAT LINES A WELL

(75) Inventors: Frank Morrison, Berkeley, CA (US); Edward Nichols, Berkeley, CA (US); Richard A. Rosthal, Richmond, CA (US); Hong Zhang, El Sobrante, CA (US); Luis E. DePavia, Orinda, CA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 628 days.

(21) Appl. No.: 12/117,089

(22) Filed: May 8, 2008

(65) Prior Publication Data

US 2009/0281731 A1     Nov. 12, 2009

(51) Int. Cl.
*G01V 1/40* (2006.01)
(52) U.S. Cl. .............. 702/7; 702/9; 702/11; 702/64; 702/66
(58) Field of Classification Search .............. 702/7, 9, 702/11, 64, 66; 324/338, 339; 175/40, 50, 175/57
See application file for complete search history.

(56) References Cited

U.S. PATENT DOCUMENTS

| | | | |
|---|---|---|---|
| 4,489,276 A | 12/1984 | Yu | |
| 7,030,617 B2 * | 4/2006 | Conti | ............ 324/339 |
| 7,755,361 B2 * | 7/2010 | Seydoux et al. | ............ 324/333 |
| 2004/0140811 A1 | 7/2004 | Conti | |

FOREIGN PATENT DOCUMENTS

| | | |
|---|---|---|
| EP | 1795920 | 6/2007 |
| GB | 2406650 A | 4/2005 |

OTHER PUBLICATIONS

Theodoulidis et al., 'Eddy Current coil interaction with a right-angled connductive wedge', 2005, MPES Publication, pp. 3123-3140.*

* cited by examiner

*Primary Examiner* — Mohamed Charioui
*Assistant Examiner* — Elias Desta
(74) *Attorney, Agent, or Firm* — Jeremy Berman

(57) ABSTRACT

Impedances of an electromagnetic (EM) coil positioned in a well lined with an electrically conductive liner are determined. The impedances correspond to plural frequencies of operation of the EM coil. Based on the impedances of the EM coil corresponding to the plural frequencies, an attenuation factor associated with the electrically conductive liner is determined.

21 Claims, 8 Drawing Sheets

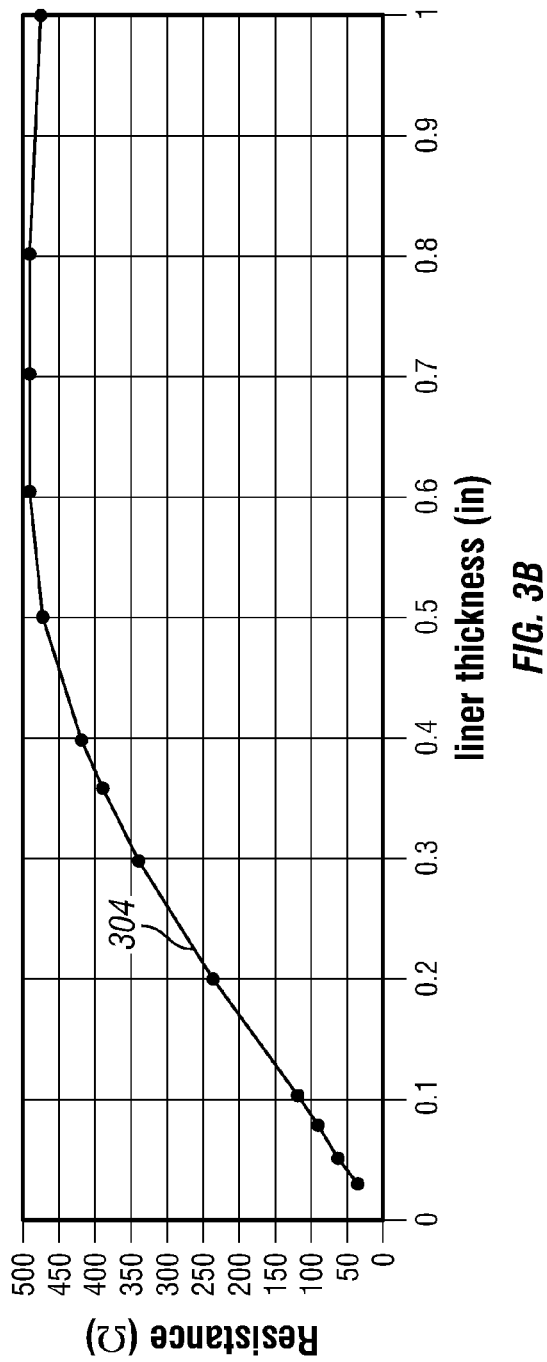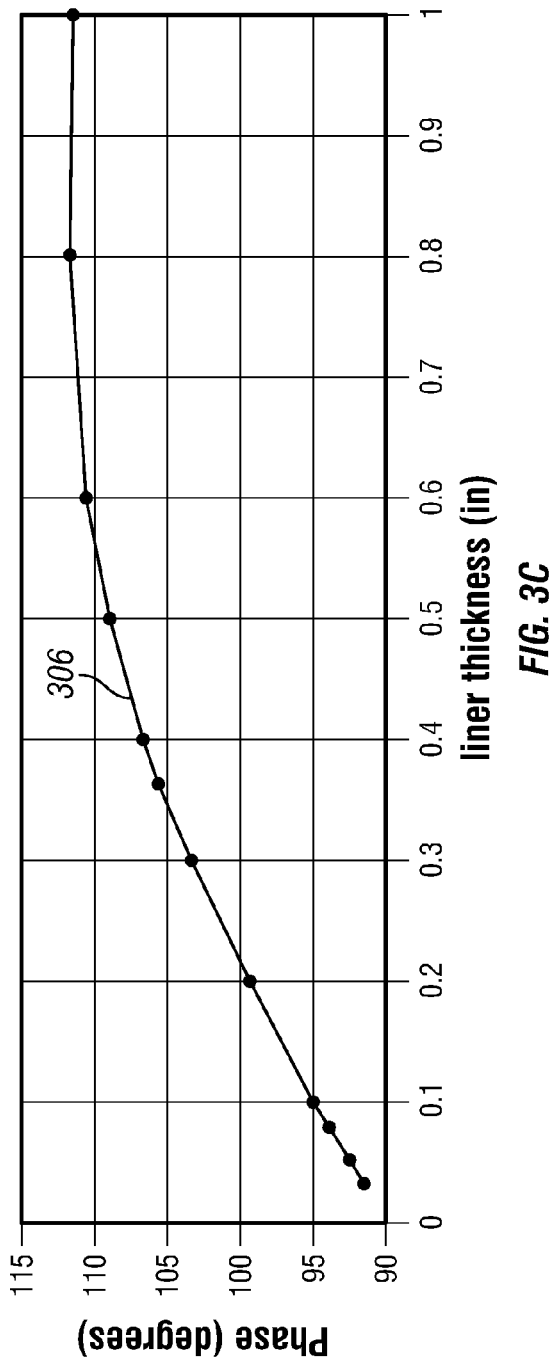
FIG. 3B
FIG. 3C

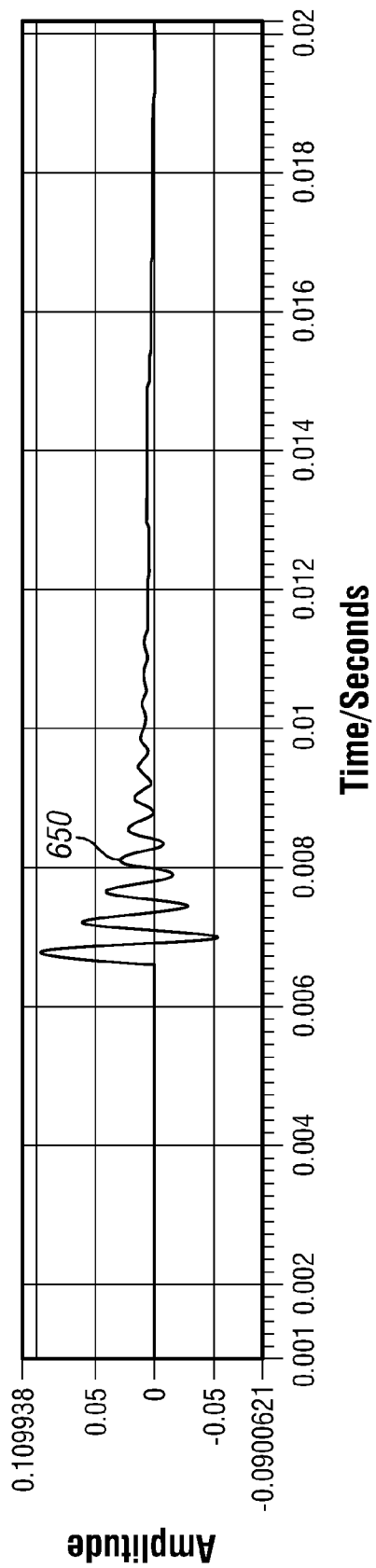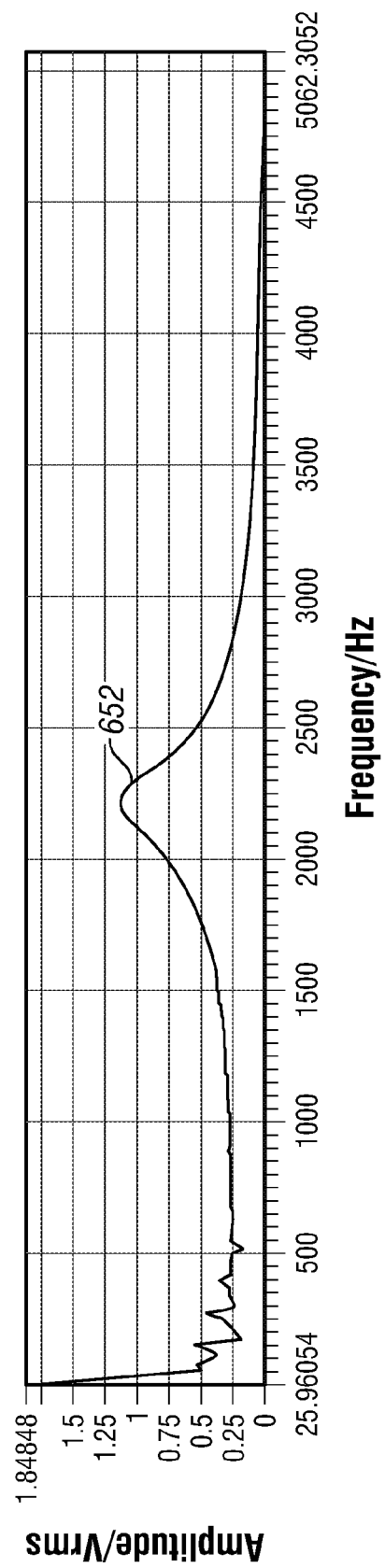
FIG. 7A
FIG. 7B

CHARACTERIZING AT LEAST ONE PROPERTY OF A LINER THAT LINES A WELL

TECHNICAL FIELD

The invention relates generally to characterizing at least one property of a liner that lines a welt.

BACKGROUND

Geological formations forming a reservoir for the accumulation of hydrocarbons in the subsurface of the earth contain a network of interconnected paths in which fluids are disposed that may ingress or egress from the reservoir. To determine the behavior of the fluids in this network, knowledge of both the porosity and permeability of the geological formations is desired. From this information, efficient development and management of hydrocarbon reservoirs may be achieved. For example, the electrical resistivity of geological formations is a function of both porosity and permeability. Considering that hydrocarbons are electrically insulating and most water contains salts, which are highly conductive, resistivity measurements are a valuable tool in determining the presence of a hydrocarbon reservoir in the formation.

One technique to measure formation resistivity involves the use of electromagnetic induction using transmitters of low frequency magnetic fields which induce electrical currents in the formation. These currents in turn produce secondary magnetic fields which are measured in an adjacent wellbore (or at some distance away in the same wellbore) by a magnetic field receiver.

The performance of a magnetic field receiver positioned within a wellbore casing may be compromised by an electrically conductive casing's effect on the magnetic field to be measured. The measurable magnetic field may be highly attenuated due to presence of the electrically conductive casing, and the measurements made by the receiver may be influenced by variations in attenuation caused by variations in the conductive casing's properties. Often, a cased wellbore reduces the magnetic field signal to a level that is undetectable by standard receivers. Moreover, the variance in conductivity, permeability, and thickness along a length of the casing makes it difficult to determine an attenuation factor (which represents attenuation of the measurable magnetic field caused by the casing) at any selected point. The inability to determine an attenuation factor at a selected point along the casing may cause errors in field measurements that are not easily corrected.

SUMMARY

In general, according to one aspect, impedances of an electromagnetic (EM) receiver positioned in a well lined with an electrically conductive liner are determined, where the impedances correspond to plural frequencies of operation of the EM receiver. Based on the impedances of the EM receiver, at least one property of the electrically conductive liner is characterized.

Other or alternative features will become apparent from the following description, from the drawings, and from the claims.

BRIEF DESCRIPTION OF THE DRAWINGS

FIGS. 2A-2B, 3A-3C, and 4A-4B are various graphs depicting relationships involving liner parameters.

FIGS. 7A and 7B illustrates application of a Fourier transform on an impulse response of an EM coil for determining an impedance of the EM coil.

DETAILED DESCRIPTION

Figure 1:
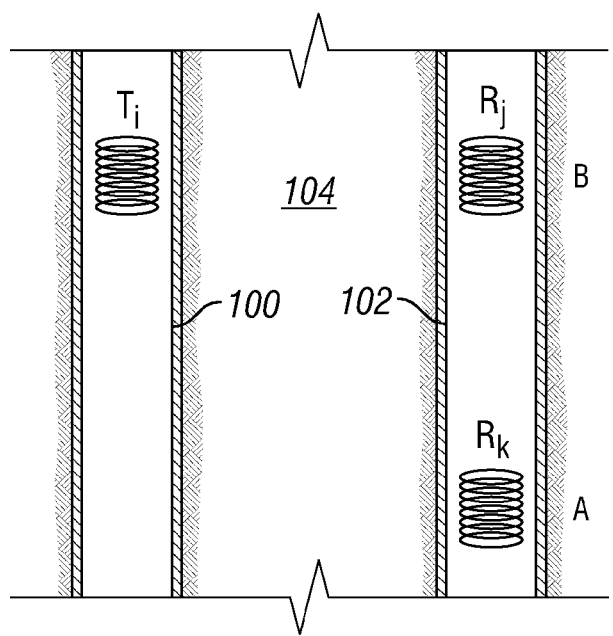
FIG. 1 illustrates an example arrangement for performing an electromagnetic (EM) induction survey.

In the following description, numerous details are set forth to provide an understanding of the present invention. However, it will be understood by those skilled in the art that the present invention may be practiced without these details and that numerous variations or modifications from the described embodiments are possible.

As used here, the terms "above" and "below"; "up" and "down"; "upper" and "lower"; "upwardly" and "downwardly"; and other like terms indicating relative positions above or below a given point or element are used in this description to more clearly describe some embodiments of the invention. However, when applied to equipment and methods for use in wells that are deviated or horizontal, such terms may refer to a left to right, right to left, or diagonal relationship as appropriate.

In accordance with some implementations, impedances of an electromagnetic (EM) receiver positioned in a well lined with an electrically conductive liner are determined, where the impedances correspond to plural frequencies of operation of the EM receiver. A "liner" refers to either a casing that lines a portion of a wellbore, or a liner positioned deeper in the wellbore that lines other portions of the wellbore. Based on the impedances of the EM receiver, an attenuation factor associated with a portion of the electrically conductive liner is characterized.

Note that the liner can have variations in conductivity, magnetic permeability, and/or diameters and thickness at different locations along the length of the liner such that the attenuation factor for the different portions of the liner can be different at these different locations. Note also that based on characterizing the conductivity, magnetic permeability and/or thickness of a portion of the liner, the attenuation factor of the liner portion can be predicted. The attenuation factor, which is complex, determines the attenuation caused by the liner portion of fields transmitted through, or received through, the liner portion.

In many implementations, an EM transmitter or receiver is a relatively long solenoid wrapped around a magnetically permeable core (collectively referred to as a "coil" or "EM coil"). The inductance and resistance of such a coil can be calculated with and without the permeable core, and with and without surrounding electrically conductive liner. When such a coil is inserted in an electrically conductive liner, the induced currents in the liner produce a secondary field that threads the coil and induces what is known as a back EMF (electromotive force, or voltage). Note that there is enhanced sensitivity to an electrically conductive liner due to use of the magnetically permeable core in the coil. This back EMF is phase-shifted with respect to the drive voltage—the back EMF's in-phase component adds resistance (R) to the coil and its out-of-phase component changes the inductance (L) of the coil. Thus, the coil impedance is changed by its coupling to the liner and the changes are dependent on the properties of the liner. Measurements of L and R at plural frequencies (at least two frequencies) are sufficient to determine the conductivity ($\sigma$), magnetic permeability ($\mu$), and thickness (t) of a liner portion at a fixed value of diameter.

FIG. 1 shows a cross-well arrangement of performing an EM induction survey, in which a transmitter $T_i$ is positioned in a first well 100 and receivers $R_j$ are provided in a second well 102 at two different positions (A and B). The transmitter $T_i$ transmits an EM field that is propagated into a reservoir 104 located between the two wells 100 and 102. The transmitted EM field produces a field, $B_{ij}$ at receiver $R_j$, where $B_{ij}$ is expressed as:

$$B_{ij}=M_i g_{ij} K_{ij} k_j k_i = G_{ij} K_{ij} k_j k_i, \quad (Eq. 1)$$

where the moment (or strength), $M_i$, of the transmitter and a purely geometric factor, $g_{ij}$ (having a predetermined value) are combined into $G_{ij}$, $K_{ij}$ is the desired formation response if a liner was not present, $k_i$ represents the liner attenuation at the transmitter, and $k_j$ represents the liner attenuation at the receiver.

In another arrangement, instead of a cross-well logging arrangement as depicted in FIG. 1, a surface-to-borehole logging or in-hole logging arrangement can be provided. In surface-to-borehole logging, transmitters are provided at an earth surface (e.g., land surface or sea floor), and EM receivers are positioned in the borehole (or vice versa). In the in-hole logging arrangement, both the EM transmitters and receivers are positioned in the same borehole.

In any of such arrangements, it is desirable to determine the liner attenuation factor(s) that cause(s) attenuation of EM fields transmitted through, or received through, liner portions such that the attenuation can be eliminated or corrected for.

The impedance of a coil (which is the ratio of the drive voltage (V) to the current (I) that flows through the coil) is equal to the sum of the coil's resistance (R) and inductive reactance, $$L\frac{dI}{dt},$$

where L is the coil's self-inductance. Note that the coil can be the coil of an EM transmitter or receiver.

Figure 2A:
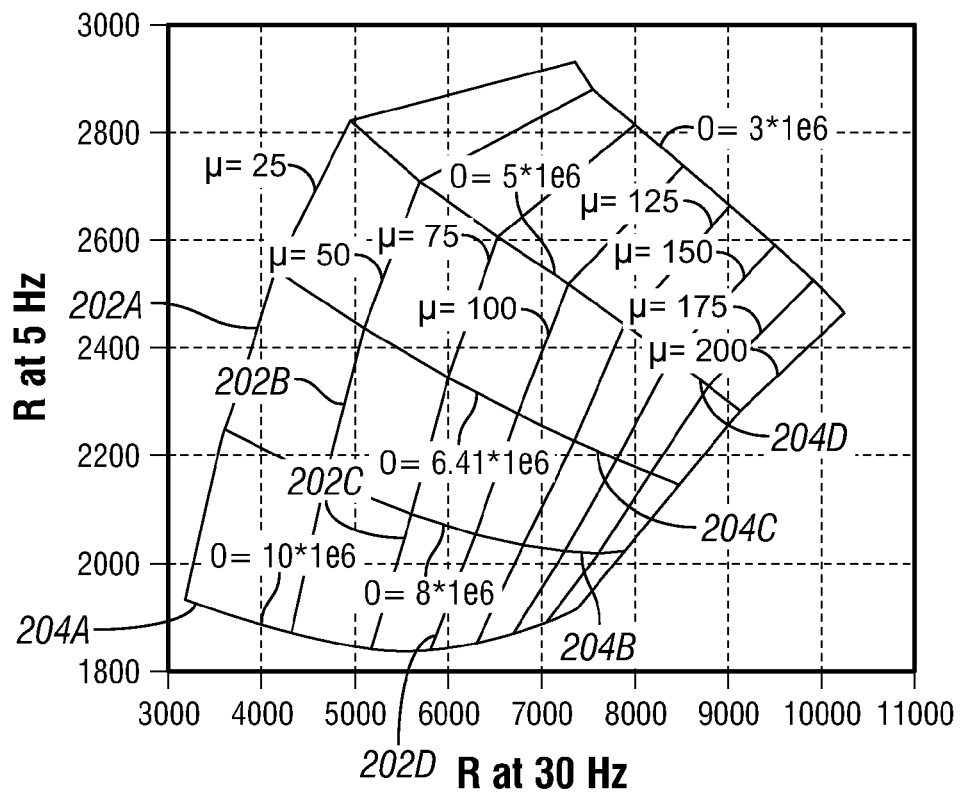

Significant and practically measurable changes in L and R of a coil can be measured for relatively small changes in $\sigma$, $\mu$, and t of a liner portion with a fixed value of diameter for frequencies (operating frequencies of the EM coil) between 1 and 100 hertz (Hz), for example. FIG. 2A is an example cross-plot that relates the resistance of a coil at two different frequencies (5 Hz on the vertical axis and 30 Hz on the horizontal axis) for varying $\sigma$ (conductivity) and $\mu$ (permeability) of a liner portion. A fixed thickness (t) and diameter of the liner are assumed. In the cross-plot, curves 202A, 202B, 202C, 202D, and so forth, that run generally up and down represent different values of magnetic permeability ($\mu$), while curves 204A, 204B, 204C, and so forth, that run generally from left to right in FIG. 2A represent different values of conductivity ($\sigma$). Each point in the cross-plot of FIG. 2A represents the resistances at 5 Hz and 30 Hz for a given value of $\sigma$ and a given value of $\mu$.

Figure 2B:
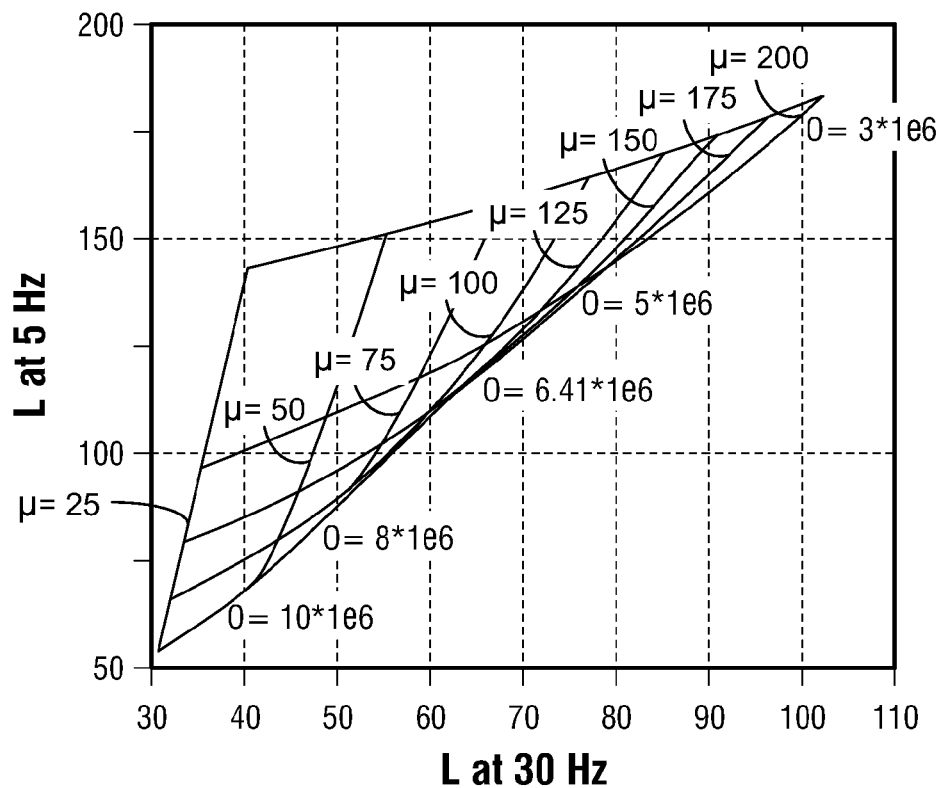

Similarly, FIG. 2B is a cross-plot that depicts the inductance at 5 Hz and the inductance at 30 Hz for various values of $\mu$ and $\sigma$ (assuming a fixed liner diameter and thickness t). As discussed further below, the values represented in FIGS. 2A and 2B can be used to generate a first table that is accessible according to some techniques to derive the conductivity and magnetic permeability of a liner portion based on impedance measurements at plural (at least two) frequencies.

According to FIGS. 2A and 2B, measurements of L and R at the two frequencies depicted (5 Hz and 30 Hz) can yield accurate estimates of $\sigma$ and $\mu$. Note that in a real tool, the measurement of L and R will also be influenced by other electrical parameters of the coil (e.g., wire resistance and inter-winding capacitance), but such influences can be compensated for.

Figure 3A:
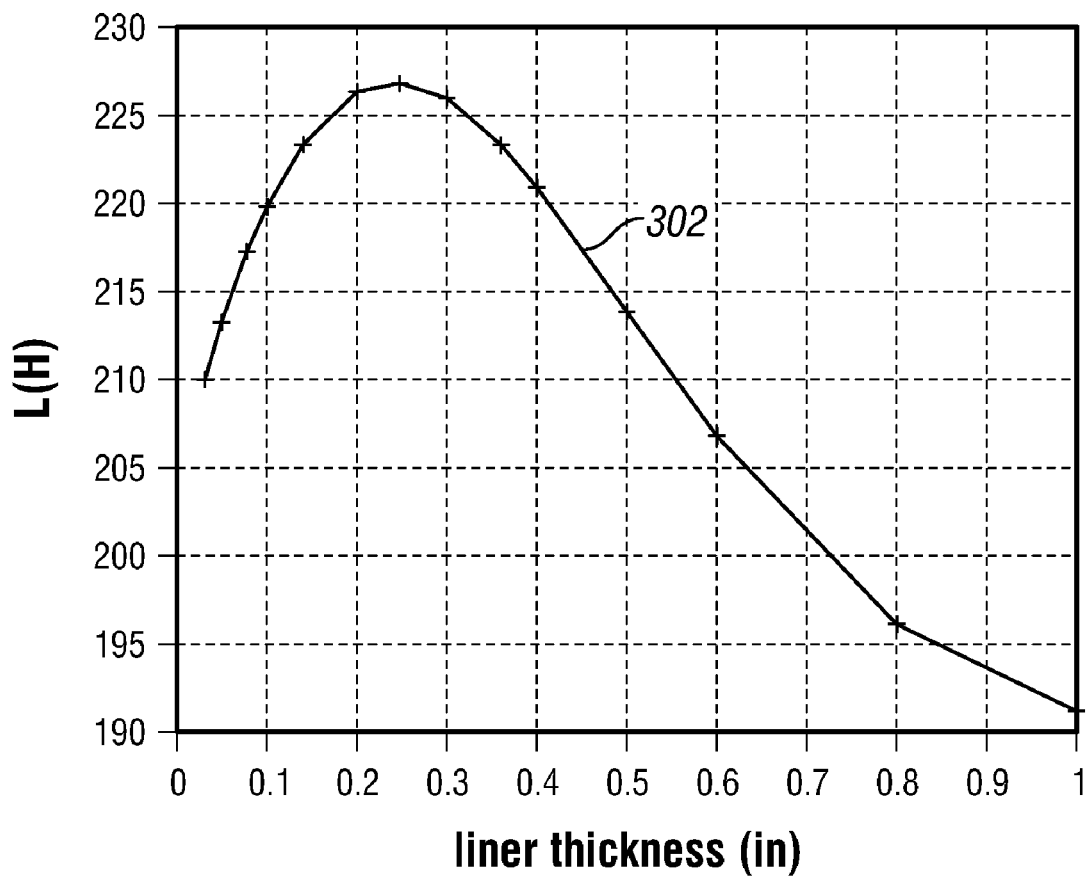

While FIGS. 2A and 2B depict the variation of R and L for different values of $\sigma$ and $\mu$, FIG. 3A shows variation of L as a function of liner thickness (t), assuming fixed values for diameter, $\sigma$ and $\mu$, and at a predefined frequency. The variation of L for different liner thicknesses is represented by curve 302 in FIG. 3A. The frequency for the example plot of FIG. 3A is a relatively low frequency (e.g., 1 Hz). At a relatively low frequency, the variation of L as a function of thickness is relatively pronounced for changes in the thickness in the range of 0.3 to 0.5 inches in the example. However, such sensitivity of L as a function of thickness would be greatly reduced at a higher frequency (e.g., 10 Hz), since once the skin depth in the liner becomes less than the thickness, the EM fields simply do not penetrate deeply enough in the liner to sense the liner's thickness.

Also, for given fixed values of diameter, $\sigma$ and $\mu$, and at a predetermined frequency, variation of the magnitude of the resistance (R) as a function of liner thickness is represented by curve 304 in FIG. 3B, and variation of the phase of the resistance (R) as a function of liner thickness is represented by curve 306 in FIG. 3C. Similar plots can be generated to show variations of R and L as a function of t at one or more other frequencies.

Since the variation of L and R as a function of liner thickness is more pronounced at lower frequencies, it is noted that measurements of L and R at plural frequencies for the purpose of determining characteristics of the liner should include at least one frequency that is relatively low, e.g., below 5 Hz.

The values corresponding to the plots of FIGS. 3A-3C and similar plots at other frequencies can also be part of the first table noted above to correlate liner thicknesses to different impedance measurements. This first table thus effectively correlates impedance measurements to different conductivity, permeability, and thickness values at various (at least two) frequencies. By using this table, given impedance measurements at plural frequencies, the conductivity, permeability, and thickness of a liner portion with a fixed value of diameter can be determined.

The field, $B_j$, seen at an EM receiver located in a liner in response to EM signals from a distant EM transmitter depends on the product of $\sigma$, $\mu$, and T in the surrounding liner. The liner properties may in fact be determined very well via L and R of the receiver itself. By showing that $\sigma$, $\mu$, and t for a fixed value of diameter can be determined by measuring L and R at multiple frequencies and realizing that $B_j$ depends on these same variables, it is then possible, in some implementations, to go directly from measurements of L and R to the liner correction factor (or attenuation factor) k needed at $B_j$ without the intermediate step of actually determining $\sigma$, $\mu$, and t.

Figure 4A:
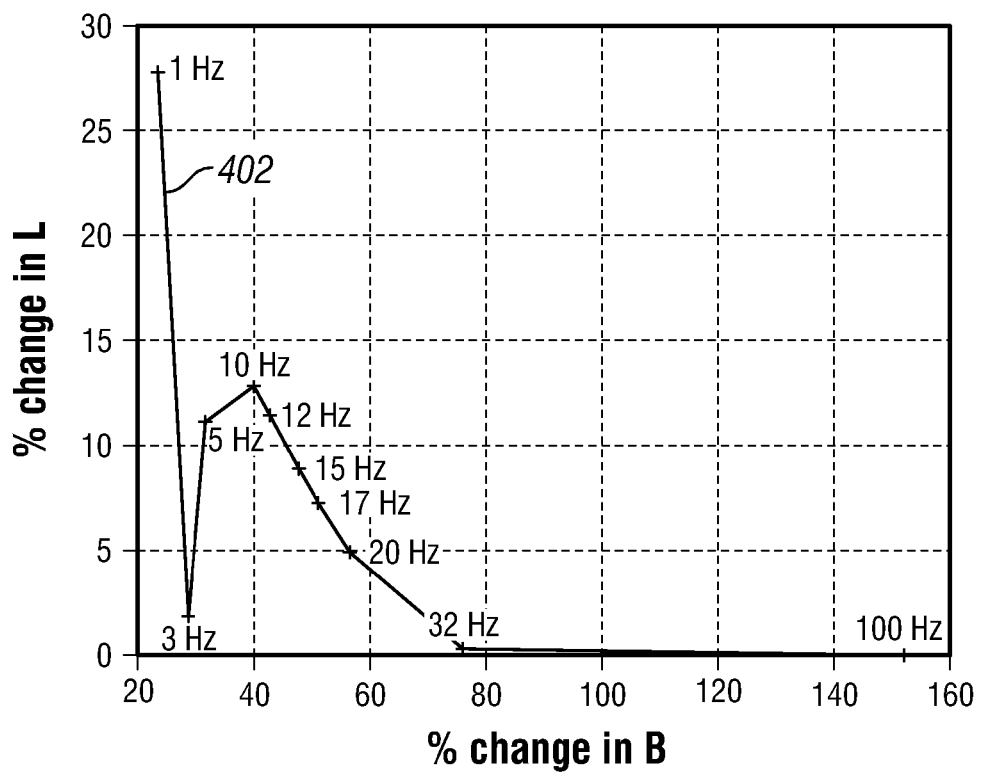
Figure 4B:
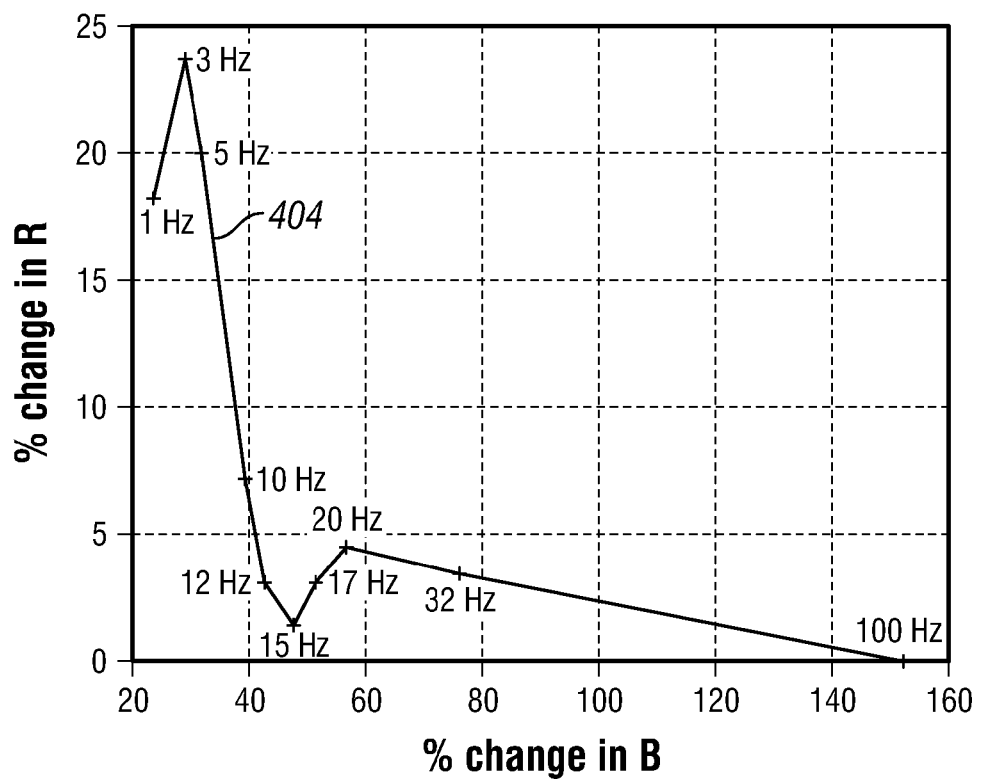

To illustrate the above, FIG. 4A shows a cross-plot containing a curve 402 representing the relationship between a percentage variation in L and the corresponding percentage variation in $B_j$ for a 0.1 inch variation in thickness about a 0.36-inch thick liner of fixed (and typical) $\sigma$ and $\mu$ at various frequencies (as indicated by the points of the curve 402). FIG. 4B similarly shows a curve 404 representing the relationship between a percentage variation in R and corresponding percentage variation of $B_j$ for a 0.1 inch variation in thickness, at various frequencies. For example, at a 10 Hz operation, the change in thickness of 0.1 inch produces a change in L of about 12.5% and a change in $B_j$ of about 40%. At an operation frequency of 32 Hz, the change in $B_j$ is about 80% and in R is about 3%. As expected, there is a general trend that the higher the frequency the less well the measurements of L and R are able to predict the far field measurements.

In one implementation, a large three-dimensional table (first table) noted above is pre-computed for various values of L and R for a particular coil for a wide range of discrete σ, μ, diameter and t values at two frequencies. Also, a corresponding table (second table) of the liner attenuation factor (previously described as $k_j$) as seen from a distant transmitter is also pre-computed for various values of L and R. Numerical interpolation through the first table of L and R values at two frequencies then yields the corresponding complex correction coefficient, $k_j$, to be provided into the second table. The liner attenuation factor $k_j$ has a known relationship to the σ, μ, and t of the liner portion with a fixed value of diameter. Thus, once σ, μ, diameter and t are known, then the corresponding $k_j$ value can be derived. Techniques according to some embodiments can thus use either the first table to derive σ, μ, and t values at a fixed value of diameter given measured impedances, or alternatively, use the second table to derive $k_j$ values given measured impedances, without explicitly determining σ, μ, and t individually.

The above has described the technique of determining the liner correction factor $k_j$ for an EM receiver. The same scheme can be used to determine the liner correction factor for an EM transmitter, noted here as $k_i$, assuming the transmitter is driven in its linear range. However, in cases where the transmitter fields are large enough to drive the transmitter into a non-linear range, the above scheme cannot be accurately used. This is because it is not possible to accurately predict the effective moment, as seen at a distant receiver, from the measurement of the input impedance when the system is non-linear.

Figure 5:
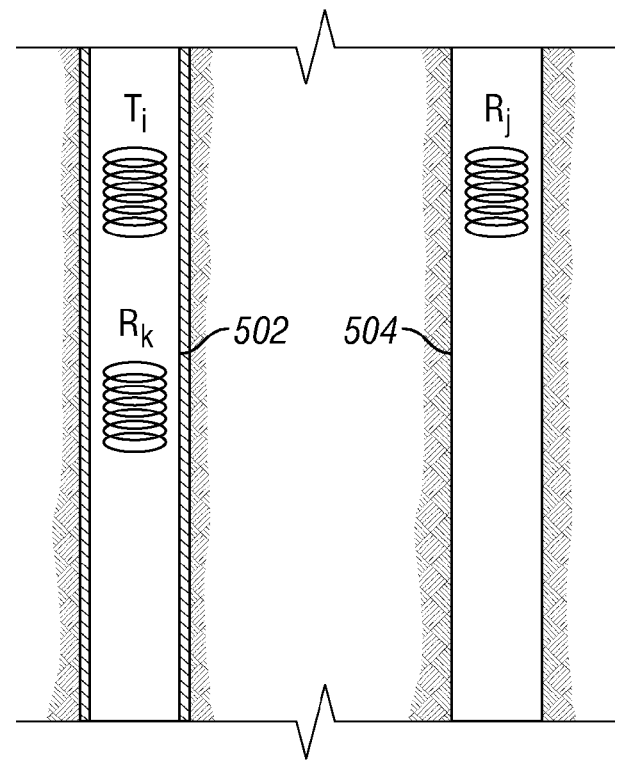
FIG. 5 illustrates another example arrangement for performing an EM induction survey.

To address the issue of the above techniques not being usable to accurately characterize properties of a liner portion adjacent an EM transmitter when the EM transmitter is driven into the non-linear region, techniques according to some embodiments can be used in combination with other techniques. For example, such other techniques include techniques that use an auxiliary receiver, such as that described in U.S. Pat. No. 7,030,617, which is hereby incorporated by reference. FIG. 5 shows an example of a cross-borehole arrangement that includes the use of a primary EM transmitter $T_i$ in a lined borehole 502 (lined with an electrically conductive liner) and a primary EM receiver $R_j$ in a second borehole 504. In addition, the arrangement includes an auxiliary receiver $R_k$ positioned in the same borehole 502 as the transmitter $T_i$. The auxiliary receiver $R_k$ is positioned close to the auxiliary transmitter $T_i$ but at a distance sufficiently away from the transmitter in the far field region. Note that in one scenario, the second borehole 504 in which the primary receiver $R_j$ is positioned is an open hole that is un-lined.

In such an arrangement, the field $B_k$ at the auxiliary receiver $R_k$ is:

$$B_{ik}=G_{ik}k_ik_k \quad \text{(Eq. 2)}$$

where $k_i$ is the liner correction factor at the transmitter $T_i$, and $k_k$ is the liner correction factor at the auxiliary receiver $R_k$ (note that in this example the primary receiver $R_j$ in the remote borehole 504 is an open hole (un-lined)). The parameter $G_{ik}$ is based on the product of the moment of the transmitter $T_i$ with a geometric factor $g_{ik}$ that has a predefined value. Because the spacing between the transmitter $T_i$ and auxiliary receiver $R_k$ is too small for there to be any formation response, Eq. 2 does not include the formation response factor $K^f$.

The field $B_j$ at the distant receiver $R_j$ is:

$$B_{ij}=G_{ij}K_{ij}^f k_i. \quad \text{(Eq. 3)}$$

Using the technique discussed above for determining liner correction factors from impedance measurements, $k_k$ (correction factor at auxiliary receiver $R_k$) can be determined by impedance measurements on the auxiliary receiver coil so that $k_i$ can be solved directly, substituting the $k_k$ from the impedance measurements (and solving for $k_i$ according to Eq. 2 by using the second table mentioned above. As a result, it is not necessary that the liner have the same properties at the transmitter and at the auxiliary receiver, nor that the coils of the transmitter and auxiliary receiver be the same since the $k_k$ determined from the impedance is the attenuation at the auxiliary receiver from fields at a distant transmitter (in this case in the same well at sufficient distance away). Solving for $k_i$ in this manner allows for the liner correction factor of the liner portion adjacent the transmitter $T_i$ to be determined, even for a transmitter that has been driven into the non-linear range.

The above has discussed the field from the transmitter in the liner as the product of term $G_{ij}$, the liner attenuation factor $k_i$, and the desired formation factor $K_{ij}^f$ (Eq. 3). $G_{ij}$ is actually made up of two parts: (1) the moment $M_{ij}$ of the solenoidal magnetically permeable metal cored coil, and (2) a purely geometric factor, $g_{ij}$, which describes how the field of such a coil would fall off in free space in the absence of the liner or the formation.

Ideally, the moment of a coil is equal to the product of the number of turns, (N), the current (I), and the effective cross-sectional area which is, in turn, the product of the actual cross-sectional area (A) and the effective area of the core material. The moment is therefore $NIA\mu_{eff}$. The moment of such a coil should, in principle, be calculated by measuring the current in the coil. However, the effective moment of the coil, that is the moment seen by a receiver distant from the coil, depends on the interaction of the coil with the surrounding liner. This has been described by ascribing an attenuation factor $k_i$ to the coil. Thus, the effective moment could be written as $M_i k_i$.

The practical difficulty is that the current I is only a good measure of M when the relationship between I and M is linear. Unfortunately, to achieve high enough moments to produce a useful field at significant distances from the transmitter, the currents are high enough to drive the permeable core and liner into a non-linear region. The practical implication of this is that simply monitoring the current of the coil is not a linear function of the true moment of the coil. Consequently, a correction scheme for liner effects should in some way depend on the measurement of the effective moment of a transmitter and not depend on the measurement of the current in the transmitter.

However, it is noted that the impedance measurement of the auxiliary receiver technique discussed above does provide a satisfactory liner correction with a minimum of auxiliary measurements. It is assumed that the auxiliary receiver can be operated as a local transmitter in which mode the impedance measured at two frequencies will provide the casing correction $k_k$ for this receiver. The currents used in this measurement are small—consequently, there are no non-linear effects.

As discussed above, the field $B_{ik}$ measured at this receiver $R_k$ from the transmitter $T_i$ is:

$$B_{ik}=M_i k_i g_{ik} k_k, \quad \text{(Eq. 4)}$$

and the field at the distant receiver, $R_j$, is given by:

$$B_{ij} = M_i k_i g_{ij} K_{ij}^f,\qquad \text{(Eq. 5)}$$

The term $M_i k_i$ in these expressions is an effective moment which includes non-linear effects and does not depend on the measurement of $M_i$ via the measurement of the current in the coil.

The impedance measurements at auxiliary receiver $R_k$ yields $k_k$ (using the second table discussed above). From Eq. 4, $M_i k_i$ can be calculated as:

$$(M_i K_i) = \frac{B_{ik}}{g_{ik} k_k},\qquad \text{(Eq. 6)}$$

where $B_{ik}$, $g_{ik}$ and $k_k$ are known.

When substituted in the expression for $B_{ij}$ (Eq. 5), this yields:

$$K_{ij}^f = \frac{B_{ij}}{(M_i k_i) g_{ij}} = \frac{B_{ij}}{B_{ik}} \frac{g_{ik} k_k}{g_{ij}} = \frac{B_{ij}}{B_{ik}} \cdot \frac{g_{ik}}{g_{ij}} \cdot k_k \qquad \text{(Eq. 7)}$$

As a result, the desired formation factor $K_{ij}^f$, can be found in terms of measured fields at the auxiliary receiver $R_k$ and the distant receiver $R_j$, a geometric factor ratio, and the liner correction term at the auxiliary receiver $R_k$.

In this manner, an elegant solution is provided for determining the effective moment of the transmitter with presence of the liner ($M_i k_i$) and the formation factor $K_{ij}^f$ without having to make assumptions regarding liner portions adjacent the transmitter $T_i$ and auxiliary receiver $R_k$ having identical liner properties.

In sum, the impedance technique described may be used to obtain liner correction for any EM receiver inside a liner. Moreover, the impedance technique may also be used to determine liner correction for an auxiliary EM receiver placed adjacent an EM transmitter in the same borehole, but separated by a small distance (e.g., 7 to 10 meters in one example). The corrected field measured at the auxiliary EM receiver is then a measure of the effective moment of the EM transmitter (as modified by presence of the liner), and is the same effective moment that is used to predict the field at a distant EM receiver (such as in another borehole). In this way, the liner correction can be obtained for the transmitter, even in a non-linear operating range of the EM transmitter.

Figure 6:
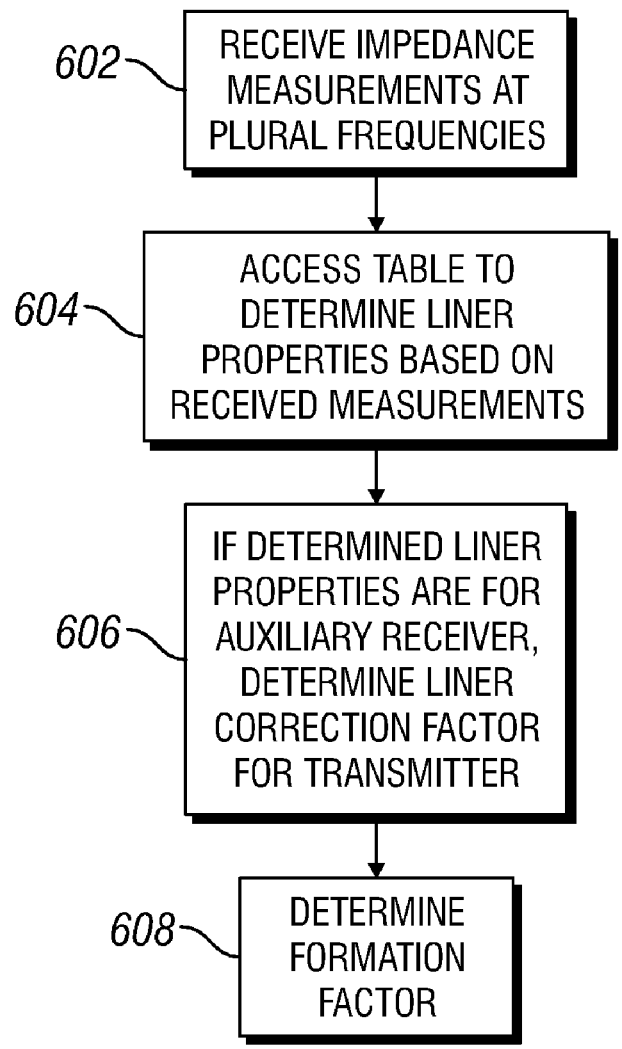
FIG. 6 is a flow diagram of a process of characterizing at least one property of a liner that lines a well based on impedances of an EM coil positioned in the liner.

FIG. 6 is a flow diagram of a technique according to some embodiments. Measurements of impedances of an EM coil are received (at 602), where the impedance measurements are at plural frequencies. The impedance of a coil is a sum of the coil's resistance (R) and inductive reactance $$L\frac{dI}{dt}.$$

Using a current sensor at the EM coil, the current (I) can be measured. The voltage (V) applied at the EM coil is also known. The ratio V/I provides the impedance (referred to as the "measured impedance"). Since measured I is known, the R and L values can be derived from the relationship of the impedance being the sum of R and $$L\frac{dI}{dt}.$$

Note that the impedance measurements for the EM coil can be of a primary receiver (such as the receiver $R_j$ in FIG. 1), or of an auxiliary receiver (such as the auxiliary receiver $R_k$ in FIG. 5), or of a transmitter (e.g., $T_i$ in FIG. 1). Based on the received measurements, the technique accesses (at 604) a table (the first table and/or second table described above) that maps R and L values at plural frequencies to liner property (ies) to determine the liner property(ies) corresponding to the received measurements. Note that a determined liner property can be the liner correction factor of the receiver (e.g., $k_i$ or $k_k$ in the example discussed above), or alternatively, the determined properties can be the conductivity ($\sigma$), magnetic permeability ($\mu$), and thickness (t) of the liner portion with a known value of diameter adjacent the receiver.

Note that if the determined liner property(ies) is (are) for an auxiliary receiver, (such as receiver $R_k$ in FIG. 5), then the determined liner property(ies), such as $k_k$, can be used to determine (at 606) liner correction factor or other liner properties for a transmitter $T_i$ that has been driven into a non-linear range. The liner correction factor determined for the transmitter can be $M_i k_i$ according to Eq. 6.

From the foregoing, the formation factor $K_{ij}^f$ (representing the response of the formation) can be determined (at 608) according to Eq. 7.

Another technique of determining the impedance (in the frequency domain) of an EM coil (of a receiver or transmitter) is based on a transient response of the EM coil. This technique involves stimulating the coil with a pulse or series of pulses and performing spectral analysis (such as Fourier transform) of the transient response. The resulting spectra is an indication of the impedance of the EM coil (receiver or transmitter) in a broad frequency range. Effectively, the measured transient response of an EM coil to an input pulse of current can be Fourier transformed to yield the voltage to current ratio in the frequency domain, which is the impedance. In practice, the impedance derived using the impulse response technique can be used to produce the R and L values, which can be mapped to desired liner properties, as discussed above in connection with FIG. 6.

Determining the impedance by performing the Fourier transform of the transient response is computationally efficient and involves a relatively simple hardware implementation. Also, since the computations can be computed quickly, real-time decisions at the wellsite is enabled, since information relating to liner property variations can be quickly determined and compensated for as appropriate.

Note that the transient response of the EM coil (of the transmitter or receiver) can be also used as a quality control measurement of the EM coil. Any variation in inductance, resistance, and/or capacitance can be detected, with an output provided that a quality issue may be present in a transmitter or receiver.

FIG. 7A shows a plot containing a curve 650 that represents a voltage amplitude at an EM receiver over time, which represents the transient response of the receiver. A Fourier transform applied on the transient response represented by the curve 650 is depicted in FIG. 7B, which shows a curve 652 that represents voltage amplitude as a function of frequency.

Figure 8:
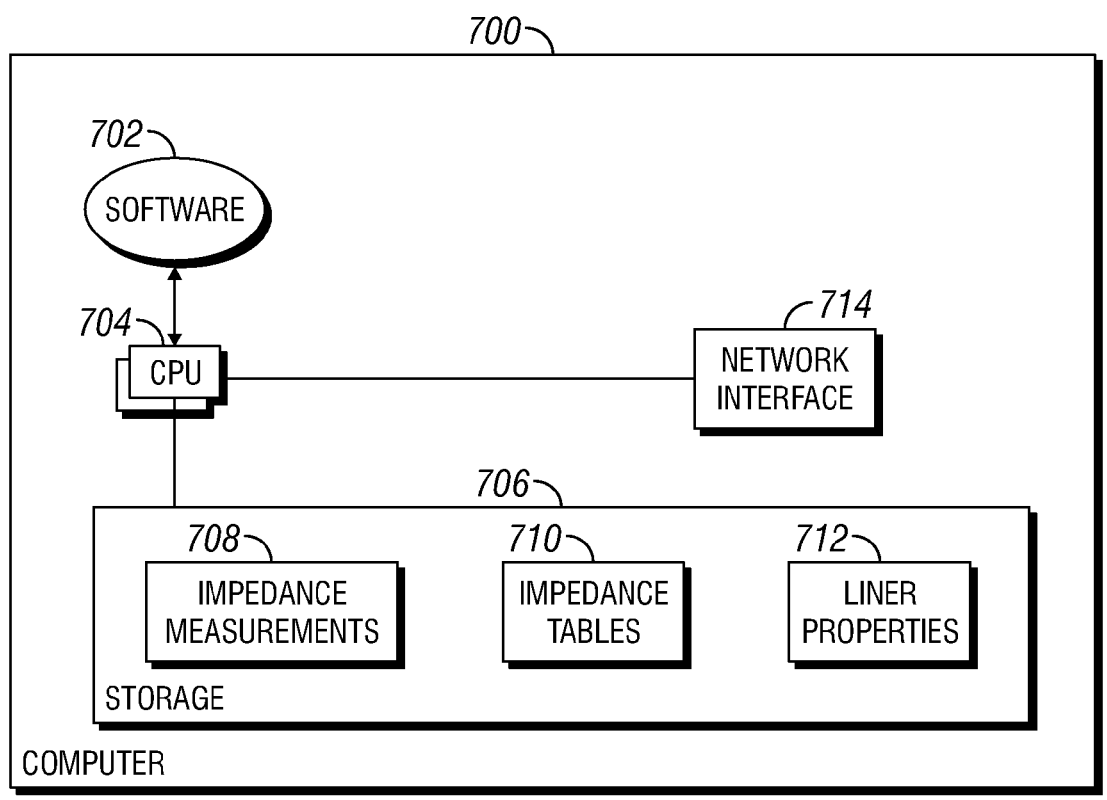
FIG. 8 is a block diagram of a computer including software executable to perform tasks according to some implementations.

The procedure of FIG. 6 can be performed by software 702, as depicted in FIG. 8, which is executable in a computer 700. Note that the computer 700 can be located at a wellsite, or at some location remote from a wellsite. The software 702 is executable on one or more central processing units (CPUs) 704, which is in turn connected to a storage 706 that contains various data, including impedance measurements 708, which can be measurements of R and L at plural frequencies, impedance tables 710, such as the first and second tables discussed above, and liner properties 712, such as liner correction factors, liner conductivity, liner magnetic permeability, and liner thickness. The computer 700 also includes a network interface 714 to allow the computer 700 to communicate with a remote network element, such as to receive the impedance measurements 708, and to output results produced by the impedance technique software 702, such as the liner properties 712.

Instructions of software described above are loaded for execution on a processor (such as the one or more CPUs 704). The processor includes microprocessors, microcontrollers, processor modules or subsystems (including one or more microprocessors or microcontrollers), or other control or computing devices. As used here, a "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. A method executed by a computer, comprising:
   receiving data relating to impedances of an electromagnetic (EM) coil positioned in a well lined with an electrically conductive liner, wherein the impedances correspond to plural frequencies of operation of the EM coil; and
   based on the impedances of the EM coil corresponding to the plural frequencies, characterizing an attenuation factor associated with the electrically conductive liner;
   wherein the impedances of the EM coil are based on:
   measuring an impulse response of the EM coil; and
   applying a spectral analysis on the impulse response.

2. The method of claim 1, wherein characterizing the attenuation factor associated with the electrically conductive liner comprises determining an effective moment, as modified by attenuation factor of the liner, of the EM coil.

3. The method of claim 1, further comprising storing a first table that correlates impedance values of the EM coil to properties of the electrically conductive liner, wherein characterizing the attenuation factor associated with the electrically conductive liner is based on accessing the first table.

4. The method of claim 3, wherein storing the first table comprises storing the first table that correlates resistance and inductance values at the plural frequencies to corresponding liner property values.

5. The method of claim 4, wherein storing the first table that correlates resistance and inductance values at the plural frequencies to corresponding liner property values comprises storing the first table that correlates the resistance and inductance values at the plural frequencies to corresponding conductivity, magnetic permeability, diameter, and thickness values of the electrically conductive liner.

6. The method of claim 4, further comprising storing a second table that correlates the resistance and inductance values at the plural frequencies to attenuation factor values, wherein characterizing the attenuation factor associated with the electrically conductive liner is further based on accessing the first table.

7. The method of claim 1, wherein receiving the data relating to the impedances of the EM coil comprises receiving the data relating to the impedances of an EM receiver positioned in the well lined with the electrically conductive liner.

8. The method of claim 7, wherein receiving the data relating to the impedances of the EM receiver comprises receiving the data relating to the impedances of an auxiliary EM receiver positioned in the well that also contains an EM transmitter.

9. The method of claim 8, wherein characterizing the attenuation factor associated with the electrically conductive liner comprises characterizing the attenuation factor associated with a first portion of the electrically conductive liner that is adjacent the auxiliary EM receiver, the method further comprising:
   determining an attenuation factor of a second portion of the electrically conductive liner that is adjacent the EM transmitter based on the attenuation factor associated with the first portion of the electrically conductive liner; and
   determining a formation factor using the attenuation factor of the first portion of the electrically conductive liner.

10. The method of claim 1, further comprising determining the impedances of the EM coil based on the data relating to the impedances of the EM coil.

11. The method of claim 1, wherein the impedances of the EM coil are determined based on a measured current and an applied voltage at the EM coil.

12. The method of claim 1, wherein the spectral analysis comprises a Fourier transform.

13. The method of claim 1, wherein receiving the data relating to the impedances of the EM coil comprises receiving the data relating to the impedances of the EM coil that has a magnetically permeable core.

14. A computer comprising:
   at least one processor; and
   software executable on the at least one processor to:
   receive data relating to impedances of an electromagnetic (EM) coil positioned in a well lined with an electrically conductive liner, wherein the impedances correspond to plural frequencies of operation of the EM coil;
   based on the impedances of the EM coil corresponding to the plural frequencies, characterize an attenuation factor associated with the electrically conductive liner; and
   further calculate the resistance and inductance values according to impedances determined by applying a spectral analysis on an impulse response of the EM coil.

15. The computer of claim 14, further comprising:
   a storage to store a table that correlates impedance values of the EM coil to values of the attenuation factor associated with the electrically conductive liner, wherein the at least one processor characterizes the attenuation factor associated with the electrically conductive liner by accessing the table.

16. The computer of claim 15, wherein the impedance values comprise resistance and inductance values.

17. The computer of claim 14, wherein the EM coil comprises one of an EM receiver and EM transmitter.

18. The computer of claim 14, wherein the EM coil has a magnetically permeable core.

19. The computer of claim 14, wherein the impedances of the EM coil comprise impedances of an EM receiver that is positioned adjacent an EM transmitter positioned in the well, wherein the characterized attenuation factor is associated with a first portion of the electrically conductive liner adjacent the EM receiver, the at least one processor to further:
characterize an attenuation factor of a second portion of the electrically conductive liner adjacent the EM transmitter based on the characterized attenuation factor of the first portion of the electrically conductive liner.

20. A system for use with a well, comprising:
an EM coil for positioning in the well that is lined with an electrically conductive liner; and
a computer to:
calculate resistance and inductance values based on measurements associated with the EM coil;
based on the calculated resistance and inductance values, determine a liner correction factor of the electrically conductive liner and;
calculate the resistance and inductance values according to impedances determined by spectral analysis by applying a Fourier transform on an impulse response of the EM coil.

21. The system of claim 20, wherein the EM coil comprises one of an EM receiver and EM transmitter, and wherein the linear correction factor is determined without determining conductivity, magnetic permeability, diameter, and thickness values of the electrically conductive liner prior to determining the linear correction factor.

* * * * *